(12) United States Patent
Goering

(10) Patent No.: US 8,161,416 B2
(45) Date of Patent: Apr. 17, 2012

(54) NAVIGATOR FOR DISPLAYS

(75) Inventor: Katharina Goering, Karlsruhe (DE)

(73) Assignee: SAP AG, Walldorf (DE)

( * ) Notice: Subject to any disclaimer, the term of this patent is extended or adjusted under 35 U.S.C. 154(b) by 1352 days.

(21) Appl. No.: 11/725,069

(22) Filed: Mar. 16, 2007

(65) Prior Publication Data

US 2008/0229242 A1    Sep. 18, 2008

(51) Int. Cl.
*G06F 17/21*    (2006.01)
(52) U.S. Cl. ........ 715/864; 715/212; 715/227; 715/228; 715/810
(58) Field of Classification Search .................... 715/864
See application file for complete search history.

(56) References Cited

U.S. PATENT DOCUMENTS

| | | | |
|---|---|---|---|
| 5,317,686 A * | 5/1994 | Salas et al. | 715/212 |
| 6,839,575 B2 * | 1/2005 | Ostergaard | 455/566 |
| 6,988,241 B1 * | 1/2006 | Guttman et al. | 715/220 |
| 7,032,181 B1 * | 4/2006 | Farcasiu | 715/764 |
| 7,272,637 B1 * | 9/2007 | Himmelstein | 709/217 |
| 7,353,462 B2 * | 4/2008 | Caffarelli | 715/825 |
| 2004/0122839 A1 * | 6/2004 | Spriestersbach | 707/101 |
| 2005/0086586 A1 * | 4/2005 | Kim | 715/503 |
| 2007/0035523 A1 * | 2/2007 | Cohen | 345/169 |
| 2008/0076368 A1 * | 3/2008 | Arrasvuori | 455/186.1 |
| 2008/0082938 A1 * | 4/2008 | Buczek | 715/784 |

* cited by examiner

*Primary Examiner* — Laurie Ries
*Assistant Examiner* — Zaida Marrero
(74) *Attorney, Agent, or Firm* — Schwegman, Lundberg & Woesnner, P.A.

(57) ABSTRACT

Various embodiments include apparatus, methods, and systems for column navigation within a view of a table or other source of two-dimensional data. Various embodiments include method comprising displaying a first column of data from a plurality of columns of data included in table and having one or more rows across each of the plurality of columns of data, displaying a second column of data from of the plurality of columns of data directly beside the first column of data so that the one or more rows in the second column of data align with the same one or more rows in the first column and displaying with the second column of data a symbol that when actuated provides an overview menu including a list of selectable columns of data included in the plurality of columns of data included in the table.

28 Claims, 12 Drawing Sheets

NAVIGATOR FOR DISPLAYS

FIELD

This application relates to apparatus, methods, and systems including navigation of data provided to a display.

BACKGROUND

Electronic devices often include a display used to provide a visual representation of information to a user. For example, cellular telephones and hand held devices such as Personal Digital Assistants (PDA) usually include some type of display for providing a visual representation of information to a user. The types of information that could be represented on the display may include a large amount of information that is arranged in columns and rows. An example of such an arrangement of information would be a listing of person's names in a first column and an associated plurality of additional columns wherein each of the associated plurality of additional columns includes information related to each person's name, such as an address, a phone number, or a customer identification number. The arrangement of data in columns and rows may include a table of data.

In some of these electronic devices, the display is not large enough to display an entire length of a row of information including all of the columns for which a particular row includes information under. For example, a particular display may have enough capacity to display only two or three columns at any given time based on the width of the columns and other factors, such as the resolution and character size of objects being displayed by the display.

A capability for horizontal scrolling of the display in order to visually display columns that are included in a table but that are not presently being displayed on the display may not be provided on a particular device. For example, a device may include a scroll wheel that allows a user to scroll vertically up and down within a list or column of information being provided on a display. However, there may be no equivalent device provided for a user to scroll horizontally between different columns of data being provided on the display. In devices that do provide a specific device or a mechanism for horizontal scrolling or paging, it is often necessary to actuate a key or actuate an input on the display screen itself several times in order to scroll or page several times to get a particular column of data to appear on the display. The large number of required scrolling or paging operations that are often required may cause the user to lose track of their place in the table, and may require the user to repeat the series of operations to return to their original starting point in the table in order to re-orient themselves to the layout and position of the data being displayed.

In addition, the limited number of columns that may be displayed at any one time on a particular display may require a user to mentally track the relationship of the data associated with a particular row of data without the benefit to being able to view on the display a leading attribute that associates the data in a particular row. A leading attribute may be any data that relates the data within a particular row, for example a name. In a table having a plurality of columns, a particular column may include a listing of a leading attribute in each row, for example a person's name. Additional columns may include secondary attribute data, such as an address, a phone number, and customer account number, wherein each secondary attribute is associated with one of the leading attributes, and is located in a same row of a table as the associated leading attribute. In devices that have limited ability to display large numbers of columns, as a user scrolls or pages away from the column including the leading attribute in order to display columns that include the secondary attributes, the display may no longer include the column showing the leading attribute, and so the user is forced to try an remember, for any particular row, for example an address or a phone number in the particular row, what the associated client name was for that row.

In addition, the scrolling or paging operations may be difficult for users having poor or impaired motor skills, and it may be difficult for users with poor spatial visualization skills to plan movements along the columns and to mentally track the association between the secondary attributes to the primary attributes as the scrolling or paging is being performed. This becomes even more difficult if the scrolling or paging between columns is further combined with scrolling or paging between rows.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the embodiments described herein may be practiced without these specific details.

The following description provides apparatus, methods, and systems for a navigator and for navigation of information provided as a visual representation on a display. Embodiments include apparatus, method, and systems for rapidly moving from one column provided on the display to a different column being provided on the display with a minimum number of selection operations having to be performed. Embodiments include apparatus, method, and systems for rapidly moving from one row or set of rows provided on the display to a different row or set of rows being provided on the display with a minimum number of selection operations having to be performed. Embodiments may include a navigator and navigation for both columns and rows of information provided as a visual representation on a display. Throughout the specification, the terms "overlay menu" and "overview menu" are used to represent any of the menus described herein, and use of one term verses another is not intended to limit the meaning or the scope of the subject matter included with the use of these terms.

Embodiments include maintaining on the display information from a first column that includes leading attributes while moving from one or more columns displaying secondary attributes to one or more different columns displaying secondary attributes while maintaining a visual relationship between the leading attributes and the newly displayed different column when these different columns are not necessarily adjacent in a data table to the column including the primary attributes.

Figure 1A:
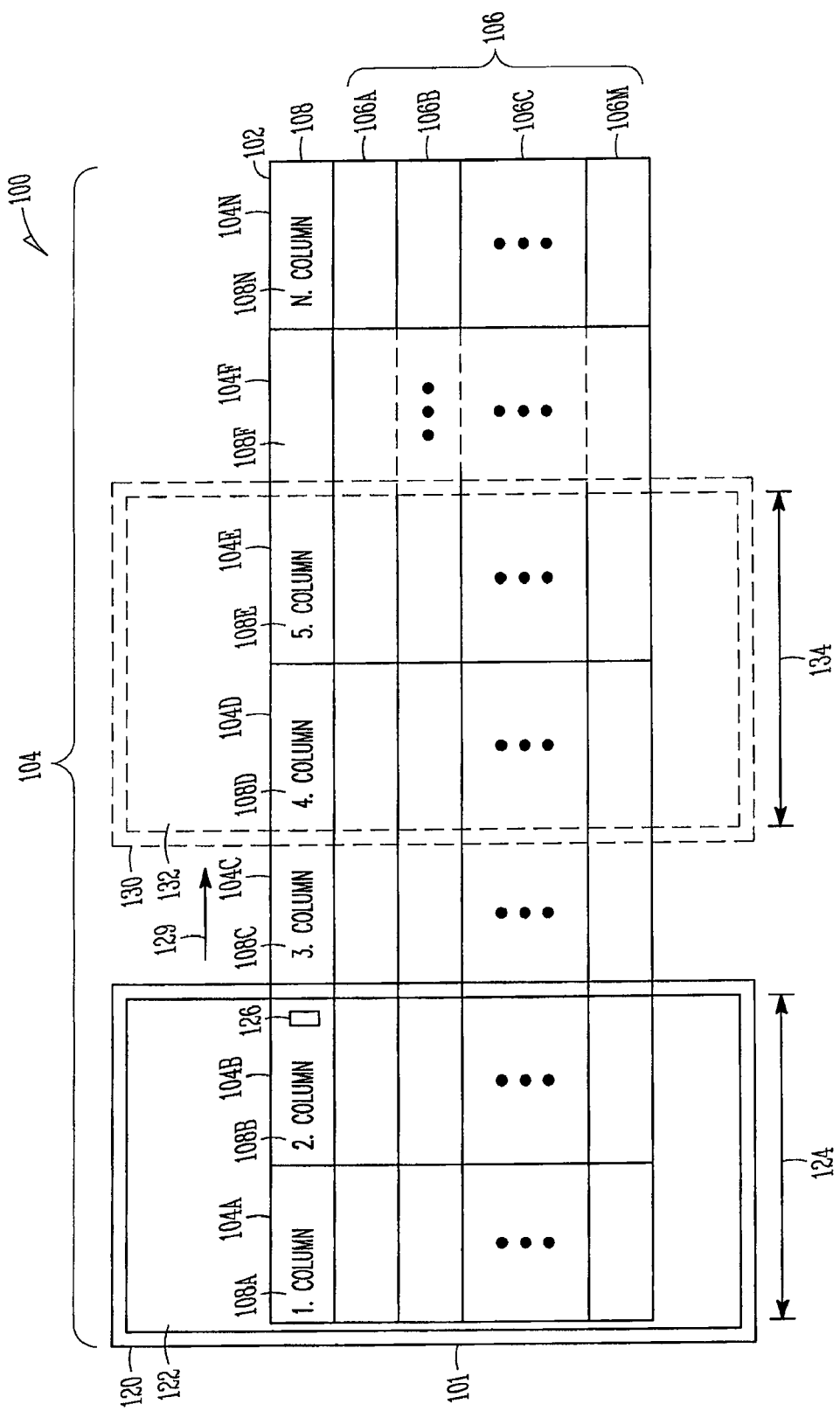
FIGS. 1A and 1B are a diagrammatic representations illustrative of visually displayed data according to various embodiments.
Figure 1B:
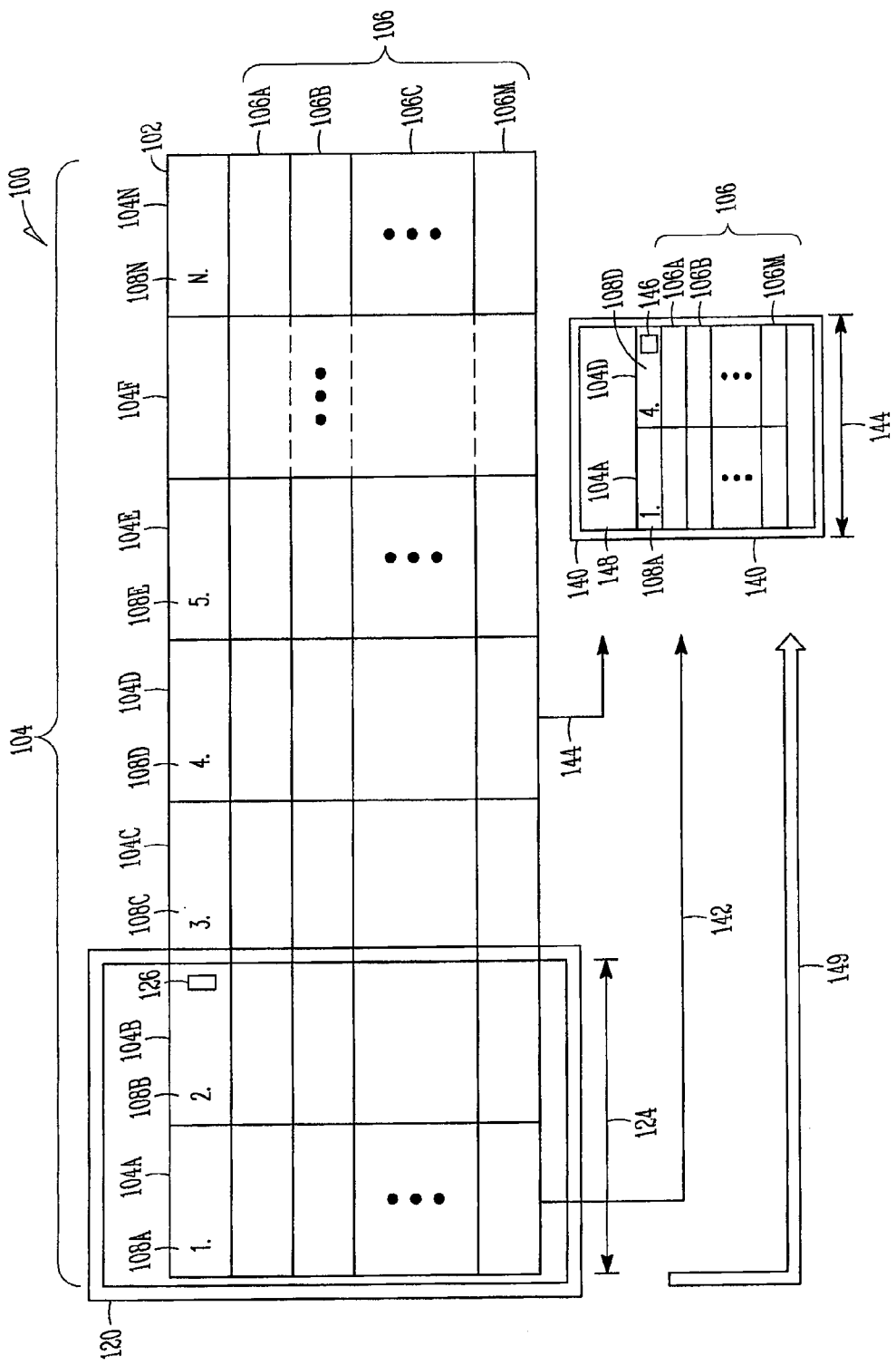

FIGS. 1A and 1B are a diagrammatic representations illustrative of visually displayed data 100 according to various embodiments. Data 100 includes a table 102 including a plurality of columns 104 including columns 104A-N and a plurality of rows 106, including rows 106A-M. Table 102 is not limited to any particular type of table, and may include any form of data that can be represented in a two-dimensional format. Table 102 is not limited to a particular number of columns 104, and may include columns 104A through 104N as represented by the dotted line in column 104F. Table 102 is not limited to a particular number of rows 106, and may include rows 106A through 106M as represented by the dotted lines in row 106C.

In various embodiments, columns 104A-N include a corresponding header 108A-N. Header 108A-N may include a column number uniquely identifying a particular column 104A-N within table 102. Header 108A-N may include information related to the data included in the column associated with the particular header, such as a description of the type of data included in rows 106A-M and within the particular column 104A-N corresponding to the particular header 108A-N.

View 120 is an illustrative indication of a frame of view including a plurality of columns from table 102 that may be displayed at any given time using a display associated with a device (not shown in FIGS. 1A and 1B). As shown in FIG. 1A, view 120 includes a viewing area 122 having a width 124 that allows a limited number of columns 104A-N to be displayed at any given time. By way of illustration, view 120 has a width 124 that allows 1. Column 104A and 2. Column 104B to be displayed at any given time. The columns 104C-104N of table 102 can not be displayed within viewing area 122 of view 120 due to width 124 and based on having the information included in columns 104A and 104B displayed at some given size.

In order to display any of columns 104C-N without increasing the width 124 of viewing area 122 (which may be a constraint of a width dimension of a given display on a particular device) and without decreasing the size of the information being displayed within a particular view, the frame of viewing may be "moved" so as to include a view of one or more different columns. By way of illustration, view 130 illustrates a view having a viewing area 132 that has a width 134 that is the same as width 124. In view 130, columns 104D and 104E are displayed in viewing area 132.

Moving between view 120 and view 130 may require a user to perform repeated request operations for scrolling or paging. For example, if each request for a new view requires moving one columns over for each request, for example from columns 104A and 104 B to columns 104B and 104C, a user would be required to make three requests to move in going from view 120 to view 130. The first request would place column 104B as the left most column in the view, the second request would place column 104C in the left most column within the view. Finally, the third request would place column 104D in the left most column within the view, as illustrated by arrow 129 and view 130. If a move across several columns is required, this could required several operations to performed, which uses time and slows the rate at which a user is able to navigate within the columns of a table of information being displayed. For persons with poor or impaired motor skills, the necessity for these repeated operations may be frustrating to the users, and may be prone to errors because of the requirement to repeatedly perform the requesting operation.

In addition, as shown in FIG. 1A, moving between view 120 and view 130 may cause a user to lose track of a leading attribute or some other type of indication associated with the data in a particular row 106 of the table 102. By way of illustration, column 104A may include a list of person's names, each name corresponding to a particular row 106A-M within the plurality of rows 106. The additional columns 104B-N may include data within each row associated with the person's name in that same row. By way of illustration, for any given row 106A-M, each column 104B-N may include data, such as an address, a telephone number, a customer identification number, etc, associated with the person's name in the same row. By moving from view 120 to view 130, column 104A is no longer provided within the viewing area 132 in view 130. The user is therefore required to try to remember which person's name is associated with whatever data is now being displayed in columns 104D and 104E in view 130.

The requirement for this mental tracking is further complicated where the movement between columns include one or more scrolling or paging operations between the rows included in a given view. Table 102 may include a number of rows, and this number of rows may exceed the available space for displaying rows in a given view. Thus, scrolling or paging between rows within a view may be required in order to view addition rows of data included in table 102 and not displayed in a given view. Assuming view 130 does not include a display capable of displaying all the rows 106A-M at any given time, if a user is viewing view 130 including columns 104D and 104E, and scrolls or pages to one or more different rows 106A-M, a user may then be required to move back to view 120 to determining a name or other leading attribute associated with these newly displayed rows. In doing so, the user will then not be able to view the columns 104D and 104E, and so again must mentally track the relationship within the table, or is constantly forced to move, scroll, or page back and forth to determine where they are in a table and to determine the relationship between the data being displayed.

FIG. 1A includes a symbol 126. Symbol 126 is illustrated as an area within header 108B. Symbol 126 is not limited to being located in any particular location within view 120. Symbol 126 is not limited to any particular type of symbol. In various embodiments, symbol 126 is a graphical icon or other graphical image. In some embodiments, symbol 126 may be a shape, for example but not limited to a square, a rectangle, a circle, or an ellipse. In various embodiments, symbol 126 represents an area within viewing area 122 that is a selectable input on a touch screen included as part of a device (not shown) providing view 120. In various embodiments, symbol 126 is selectable using a cursor (now shown) as included as part of a display providing view 120.

Symbol 126 may be used as further described herein to navigate and change the particular columns include within a given view. In various embodiments, a select operation involving symbol 126 provides a overview menu as further described herein, from which a column may be chosen for display within a new view to be provided within a given view.

FIG. 1B illustrates how view 120 may be altered to provide a view 140. View 120 in FIG. 1B includes a width 124 and includes a visual representation of columns 104A and 104B, and symbol 126. A selection operation on symbol 126 allows a user to request a view 140 including column 104D. View 140 includes viewing area 148 having a width 144 that is the same width as width 124 of view 120. View 140 includes columns 104A and 104D beside 104A. In various embodiments, moving from view 120 to view 140 as indicated by arrow 149 includes replacing column 104B with column 104D as indicated by arrow 144, while keeping columns 104A in view 140, as indicated by arrow 142. In various embodiments, view 140 includes header 108D included in column 104D. In various embodiments, header 108D includes symbol 146, which may be the same as symbol 126 as included in view 120. In various embodiments, moving from view 120 to view 140 includes automatically aligning rows 106A-106M with the corresponding same rows 106A-106M in column 104A.

In moving from view 120 to view 140, a user is required to perform as few as two request operations, as further described herein, no matter how far apart in table 102 the columns being displayed and the desired columns to be displayed are in a table such as table 102. Thus, it may be easier for a person with impaired motor skills to move between these views, or any other changes involving the columns displayed in the view involving navigation between columns. Because these moves require less operations on the part of the user, it is less time consuming and is less prone to error.

In addition, as shown by way of illustration in view 140, a user is able to see a relationship within a same view at any given time between data in first column and data within a second column wherein the columns are not necessarily located directly beside one and other in a given table. As shown in view 140, a single view is provided that includes 1. Column 104A and 4. Column 104D, despite the fact that these columns are not directly beside one and other in table 102. This ability allows a user to view within a same given view a column including primary attributes (such as column 1 that may include persons' names) and a column including a secondary attribute such a customer number associated with the primary attribute and aligned to properly associate the rows across each of the columns included in the view. This feature helps eliminate the necessity to remember the association within a given row, and helps to reduce the need to mentally remember what association exits between the data in the column including the primary attribute and the one or more columns including the secondary attributes. This feature may also reduce or eliminate the need to scroll or page back and forth between views in order to mentally track the association between data in different columns.

View 140 may also provide for scrolling or paging between the plurality of rows 106A-M being displayed in view 140 while maintaining the proper alignment of the data displayed in column 104A and 104D within view 140. This feature further reduces the need to page back and forth between columns to include column 104A as view 140 is altered to view different rows 106A-M. This feature is particularly helpful in embodiments where column 104A includes a primary attribute.

In various embodiments, moving from view 120 to view 140 may include adding any one (or more than one) columns 104B-N from the plurality of columns 104 to a view including column 104A, and is not limited to adding column 104D to the view as shown in FIG. 1B. In addition, symbol 146 in view 140 may be used to again change to a different view, as further described herein, which may include any one (or more than one) of columns 104B-104N being included in a same view as column 104A.

Figure 2:
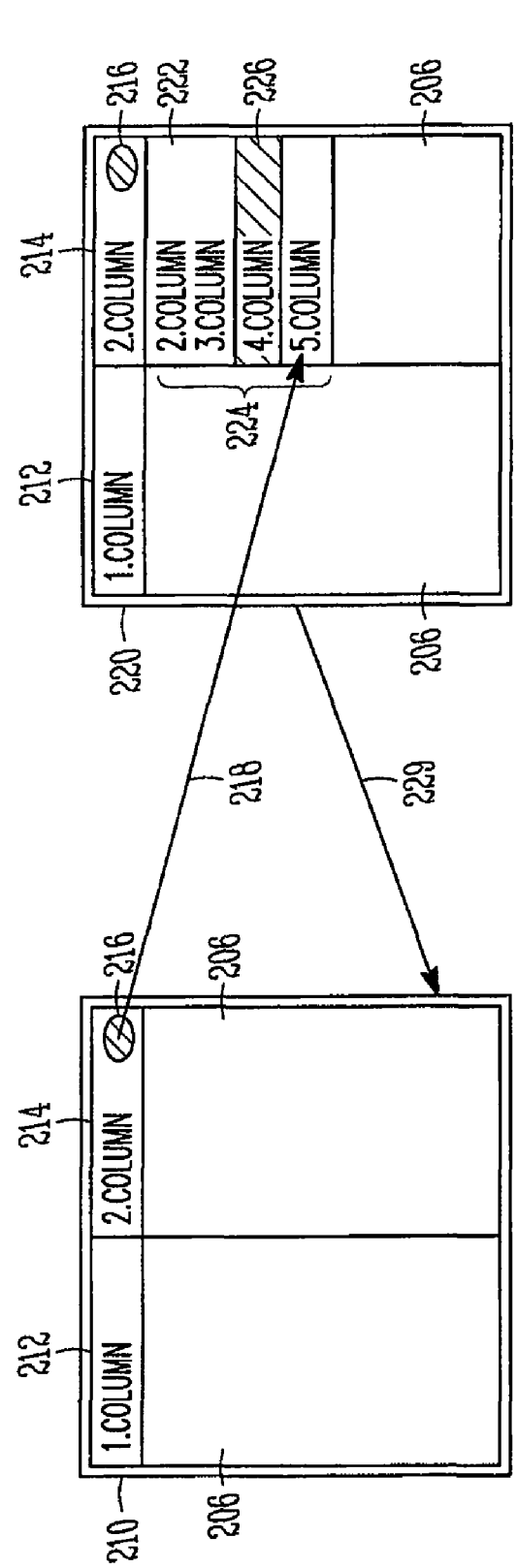
FIG. 2 is a diagrammatic representation of illustrative views provided by various embodiments.

FIG. 2 is a diagrammatic representation of illustrative views 200 provided by various embodiments. Views 200 include view 210 and view 220. View 210 includes 1. Column 212 and 2. Column 214, each having one or more rows 206. 2. Column 214 includes symbol 216. Symbol 216 is not limited to any particular type of symbol, and in various embodiments is the same as symbol 126 as described above with respect to FIGS. 1A and 1B. It would be understood that view 210 is not limited to displaying any two particular columns, and may include any two (or more) columns from a given table or a given source of two-dimensional data.

As shown in FIG. 2, a request operation may be performed involving symbol 216 resulting in view 220, as shown by arrow 218. View 220 includes 1. Column 212 and 2. Column 214, each having one or more rows 206. 2. Column 214 in view 220 includes symbol 216. In addition, view 220 includes overview menu 222 including a listing 224 of a plurality of columns available for display. In some embodiments, overview menu 222 is provided as a layer over a portion of view 220 including the rows 206 in 2. Column 214. However, the portion of view 220 providing overview menu 222 is not limited to any particular portion of view 220, and may be provided as an overlaying layer in any portion of view 220. In various embodiments, the listing of columns available for display in the overview menu 222 will not include the column currently being displayed on the left hand column 212 of the view.

In view 220, 4. Column 226 is illustrated as being highlighted within listing 224. In various embodiments, any entry within listing 224 may be selected, wherein 4. Column 226 being indicated as selected is merely illustrative. Any way of performing the selection of one of the entries included in listing 224 may be used. In various embodiments, a selection of one of the entries within listing 224 may be made using a touch screen function provided on a display (not shown) providing view 220. By performing a selection operation of one of the entries within listing 224, view 220 may be changed to another view including 1. Column 212 and the column selected from listing 224, as further described with respect to but not limited to FIG. 3, FIGS. 4A and 4B, FIG. 5, and FIG. 6. In various embodiments, a second request, involving an actuation of symbol 216 while the overview menu 222 is being displayed and before a selection from the overview menu 222 is made will result in the overview menu 222 being removed from the view, and the columns of data in the view will remaining unchanged, as illustrated by arrow 229.

Figure 3:
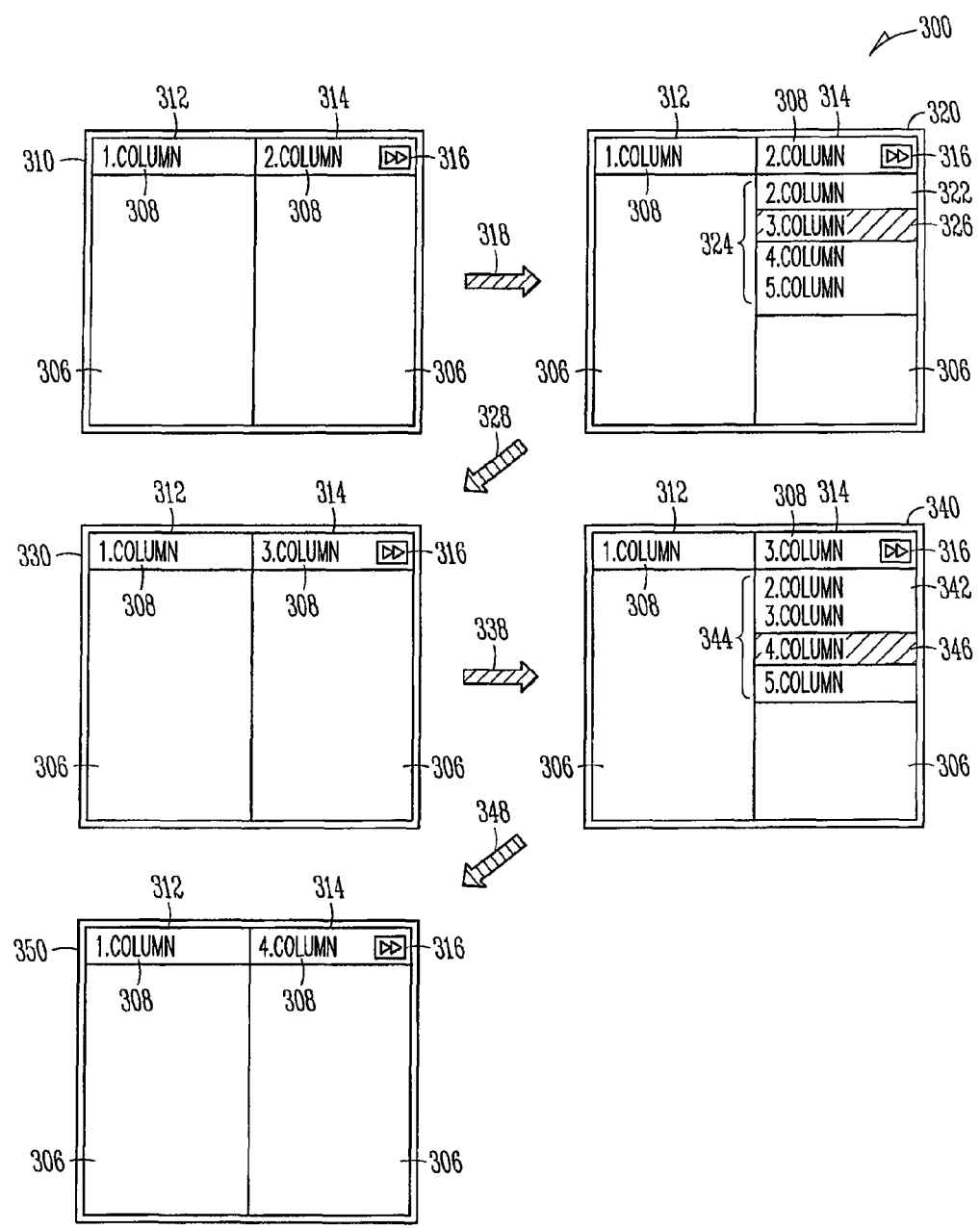
FIG. 3 is a diagrammatic representation of an illustrative sequence of views provided in various embodiments.

FIG. 3 is a diagrammatic representation of an illustrative sequence of views 300 provided in various embodiments. Views 300 include view 310, view 320, view 330, view 340 and view 350. Each of views 310, 320, 330, 340, and 350 includes columns 312 on the left hand side of the view, and column 314 on the right hand side of the view. Each of views 310, 320, 330, 340, and 350 includes rows 306 in each of columns 312 and 314 and a header 308 for each of columns 312 and 314. Each of views 310, 320, 330, 340, and 350 includes a symbol 316 in the header 308 associated with column 314. In view 300, symbol 316 includes a double arrow head. However, symbol 316 is not limited to any particular symbol.

In various embodiments, symbol 316 may include a different graphical representation or a different character in one or more of views 310, 320, 330, 340, and 350. In various embodiments, symbol 316 may provide arrows indicating that columns which are not displayed in the current view are included in a table on a side of the column currently displayed at column 314 as indicated by the direction of the arrows included in symbol 316. For illustrative purposes, the double arrows pointing to the right in header 308 of column 314 could be used to indicate that only columns to the right of where the data displayed in column 314 appears in the table providing the data for the view are available. Further, a first arrow pointing to the right and a second arrow pointing to the left could indicate that columns of data in the table are located on both sides of column of data currently being displayed in column 314 and are available for display, and a pair of double arrows pointing to the left could be used to indicate that only columns to the left of where the data displayed in column 314 appears in the table are available for display.

In various embodiments, a request operation made by selecting the symbol 316 in view 310 results in displaying view 320 as indicated by arrow 318. View 320 includes overview menu 322 including listing 324. In various embodiments, overview menu 322 appears as a displayed layer appearing over one or more of rows 306 in column 314 of view 320. The appearance of overview menu 322 in view 320 is a result occurring because of selecting symbol 316 in view 310. In view 320, listing 324 includes a selectable entry for a plurality of columns available for display. In various embodiments, each of the plurality of columns included in listing 324 are columns associated with 1. Column as displayed in column 312 of views 300.

As shown in view 320, a selection on one of the columns in listing 324 is indicated by entry 326 being illustrated as highlighted. Entry 326 corresponds to a request to display the 3. Column. As a result of the selection of entry 326, the displayed view changes from view 320 to view 330 as illustrated by arrow 328.

As shown in view 330, 1. Column data remains displayed in column 312 of view 330, and the 3. Column data has replaced the 2. Column data in the right hand column of view 330. Header 308 in column 314 of view 330 now corresponds to the data in 3. Column. Symbol 316 is also now displayed in header 308 in column 314 of view 330.

The process of selecting a different column to be displayed in the right hand side of views 300 may be repeated by again selecting symbol 316 in view 330, resulting in the displaying of view 340 as indicated by arrow 338. View 340 includes overview menu 342 including listing 344. By making a selection of entry 346 (as illustrated by entry 346 being highlighted in view 340), view 350 may be displayed as illustrated by arrow 348. View 350 retains 1. Column data in column 312 of view 350. View 350 includes 4. Column data displayed on the right hand side of view 350 in place of the 3. Column data in view 340. View 350 also includes symbol 316 in header 308 included in column 314 of view 350.

It would be understood that this process could be repeated without limit in order to display any column available in the overview menu beside the 1. Column data provided on the left hand side of views 300.

Figure 4A:
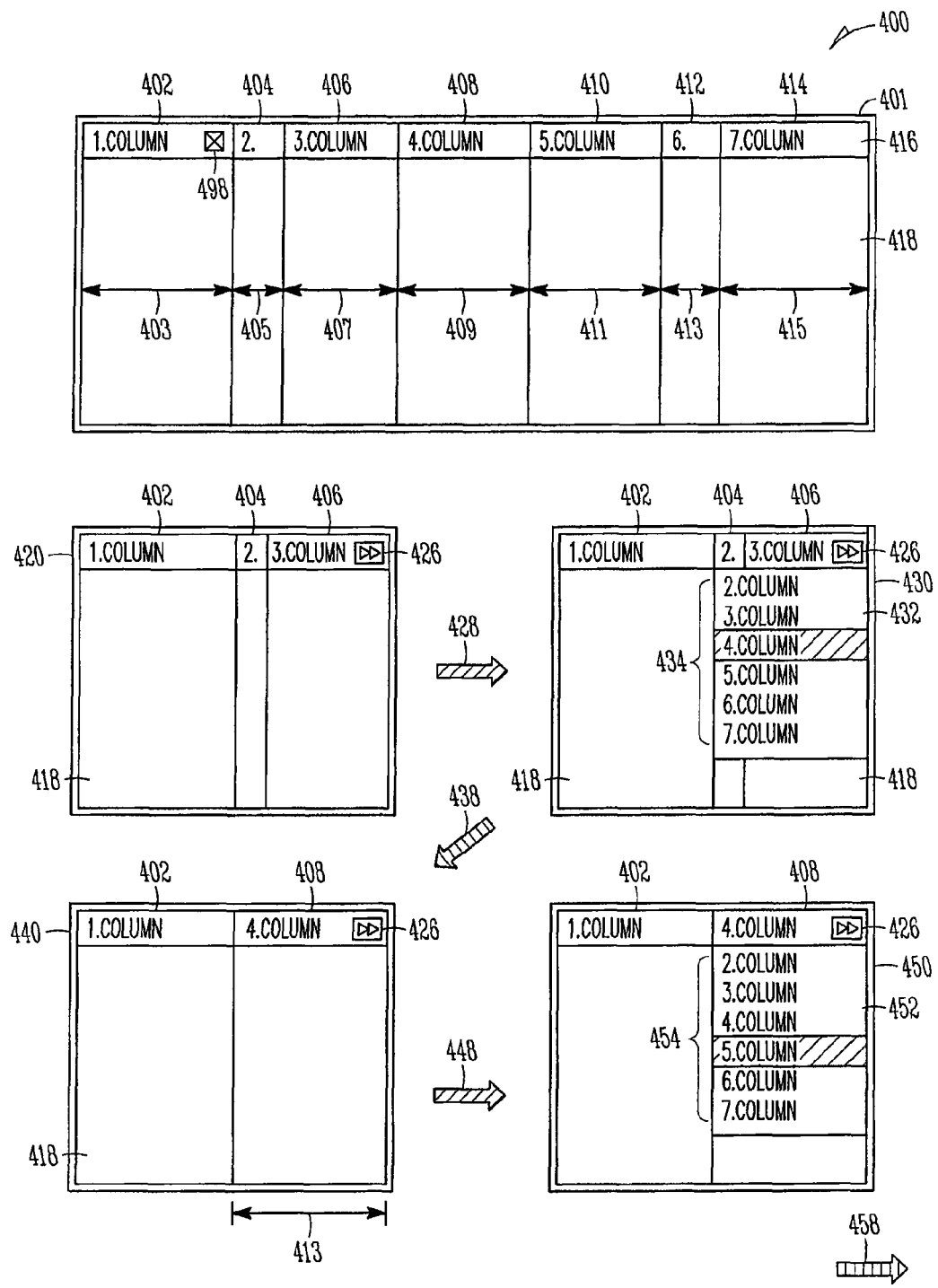
FIGS. 4A and 4B are a diagrammatic representations of an illustrative table and an illustrative sequence of views provided in various embodiments.
Figure 4B:
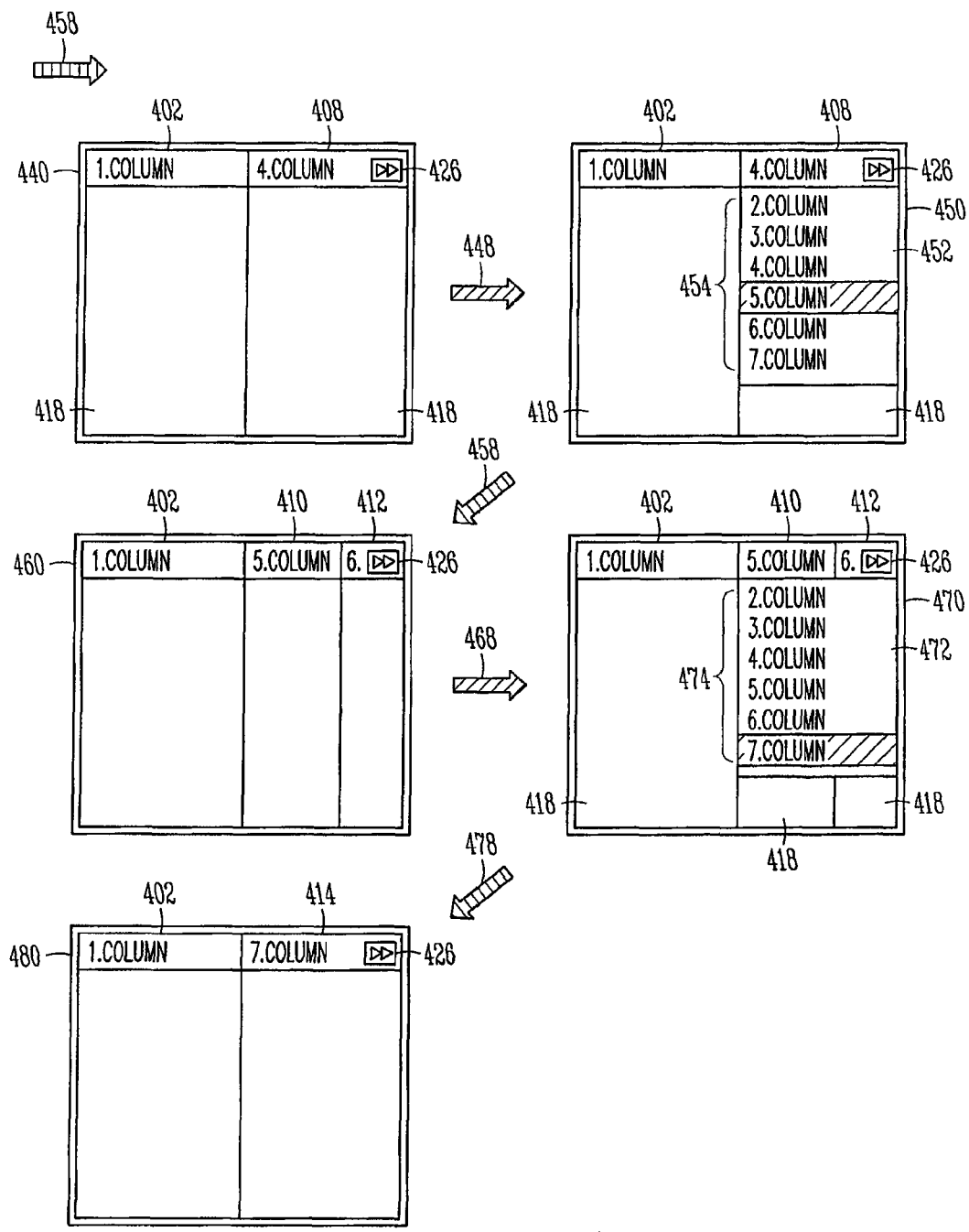

FIGS. 4A and 4B are a diagrammatic representations of an illustrative table 401 and an illustrative sequence of views 400 provided in various embodiments. Views 400 are based on illustrative displays of data from columns included in illustrative table 401. Illustrative table 401 includes columns 402, 404, 406, 408, 410, 412, and 414. As shown in table 401, columns 402, 404, 406, 408, 410, 412, and 414 have various and different widths. Widths of columns 402, 404, 406, 408, 410, 412, and 414 are not limited to any particular value for a width associated with a column. In some embodiments, the widths may be based on the width required to display any given number of characters or graphical symbols, wherein a minimum width is required to display each character or graphical symbol, and being limited to a width that is allocated for a particular column of the display. Thus, in some embodiments, a given width is allocated and provides enough width to display a maximum number of characters or graphical symbols for any given column. For illustrative purposes, 402 has a width 403 that is greater than a width 405 and a width 407 of columns 404 and 406 respectively. Further, the width 407 of column 406 is greater than the width 405 of column 404. This variation of widths will have an effect on the number of columns that may be displayed at any give time on a particular display (not shown) having a particular display width for any given view and assuming the width of the displayed columns is not substantially reduced below the illustrative width as indicated in table 401.

Views 400 include views 420, 430, 440, 450, 460, 470, and 480. View 440 and view 450 are shown toward the bottom of FIG. 4A and are shown again toward the top of FIG. 4B for ease in understanding the changes to the views as illustrated in FIGS. 4A and 4B.

Symbol 426 as included in views 420, 440, and 460 may be used to request an overview menu in each of views 420, 440, 460, resulting in the display of overview menus 432, 452, and 472, in views 430, 450, and 470 respectively as illustrated by arrows 428, 448, and 468 respectively. A selection made from the overview menus 432, 452, and 472 results in displaying of views 440, 460, and 480 respectively as illustrated by arrows 438, 458, and 478 respectively.

As shown in view 420, the left hand column 402 includes 1. Column data from table 401, and the right hand column includes both the 2. Column 404 and the 3. Column 406 data from table 401. A determination has been made that based on the available width in the right hand column of view 420, both 2. Column data and 3. Column data may be displayed due to the smaller widths 405 and 407 of these immediately adjacent columns from table 401.

A request for an overview menu is made using symbol 426 in view 420, resulting in view 430 being displayed including overview menu 432. A selection of 4. Column data from listing 434 in overview menu 432 results in view 440. View 440 retains 1. Column 402 data from table 401 in the left hand column of view 440, and replaces 2. Column 404 data and 3. Column 406 data with 4. Column 408 data for table 401 in the right hand column in view 440. Because a width 409 of 4. Column 408 and a width 411 of 5. Column 410 exceeds a width 413 available on the right hand column of view 440, only the 4. Column 408 data is included in view 440 as a result of the selection made from overview menu 432 in view 430.

Another request made using symbol 426 in view 440 results in displaying of overview menu 452 in view 450, and a selection is made in view 450 of the 5. Column 410 data from listing 454, resulting in view 460 as illustrated by arrow 458. Based on a width 411 of 5. column 410, and a width 413 of the next adjacent column 6. Column 412 in table 401, a determination is made to include both 5. Column 410 and 6. Column 412 in the right hand column of view 460.

Another request made using symbol 426 in view 460 results in displaying of overview menu 472 in view 470, and a selection is made in view 470 of the 7. Column 414 data from listing 474, resulting in view 480, as illustrated by arrow 478. Based on a width 415 of 7. Column 414, a determination is made to include only 7. Column 414 data in the right hand column of view 480.

Thus, the selection of different columns from table 401 to be displayed on the right hand column of a given view may be repeatedly made in order to provide a display including different columns of data aligned with the corresponding data from a fixed column of data displayed in the left hand side of a given view. In various embodiments, the fixed column is a default column from illustrative table 401. In various embodiments, an indication 498 of which column within a table is to be the default column may be stored within the table itself. In addition, various embodiments include automatically determining if more than one column of data may be included in a given view based on the selection of a single column from an overview menu. In various embodiments, the determination is made based on a known width of a view and the known widths of the column selected for display and the width of one or more columns adjacent to the column selected for display.

In various embodiments, not all columns available in table 401 may be provided in a particular overview menu. In some embodiments, only columns having a particularly characteristic, for instance smaller width as included in column 406 having smaller width 405 and column 412 having smaller width 413, are provided when requesting a overview menu and a narrow column, such as column 404 having a narrow width 405 is already being displayed in a view. In various embodiments, only columns having a width sufficient to allow a second column and the selected column to both be displayed in addition the column of data in the left hand column of a view are provided in an overview menu. In various embodiments, the criteria for determine what columns of data will be presented in an overview menu may be user configurable.

Figure 5A:
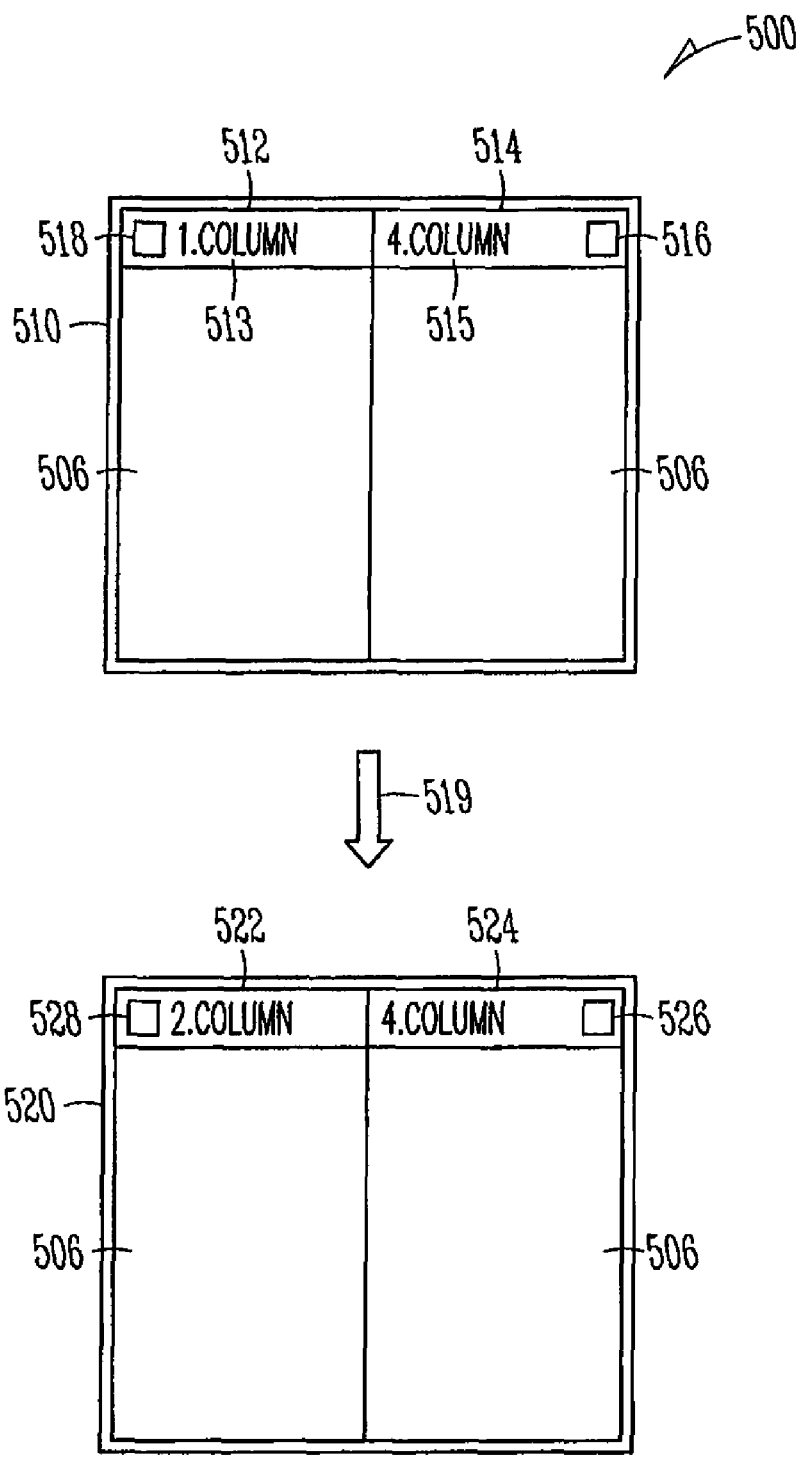
FIGS. 5A and 5B are a diagrammatic representation of illustrative views provided in various embodiments.

FIG. 5A is a diagrammatic representation of illustrative views 500 provided in various embodiments. Views 500 includes view 510 and view 520.

In various embodiments, the column displayed in the left hand side of a given view is determined to be a default column of data from a given table or a given two-dimensional data source. It would be understood that embodiments include the default column as the right hand column for a given view. In various embodiments, the default column may be the first or most left hand column of data in a table or other two-dimensional data source. In various embodiments, the default column of data is determined from a default column setting that is configurable for any given table or any given two-dimensional data source, and may be a value stored as part of the given table or the given two-dimensional data source. In various embodiments, the default column is user configurable and is configurable independently of the arrangement of the data in a table or a two-dimensional data source being used to provide the columns of data for display.

In some embodiments, a view may include a symbol operable to provide a request, upon selection of the symbol, for an overview menu and selection a different column to be display in the left hand column of a view. As shown in FIG. 5, view 510 includes a column 512 in the left hand column of view 510, and column 514 in a right hand column of view 510. Column 512 includes 1. Column data, and a header 513 including a symbol 518. As also shown in FIG. 5, view 510 includes column 514 in the right hand column of view 510 including 4. Column data and a header 515 including a symbol 516. Symbols 516 and 518 are not limited to any particular type of symbols, and may be any symbol as described herein for use in requesting an overview menu. In various embodiments, symbol 514 is a different symbol from symbol 518. In various embodiments, symbol 518 may be used to request an overview menu from which a selection of a different column from 1. column may be made.

Selection of a different column from the resulting overview menu provides a different view, for example view 520, with the left hand column 522 of view 520 now displaying the 2. Column data. As shown in view 520, the right hand column 524 of view 520 remains displaying the 4. Column data despite the change to the left hand column 522. In various embodiments, changes to the column of data displayed in column 524 can also be made by requesting a overview menu using symbol 526, and making a selection from the provided overview menu. In various embodiments, the data in rows 506 is aligned so as to maintain the proper association of data within the rows when replacing the displayed column in either column 512 and column 514.

In various embodiments, the overview menu provided for column 522 will overlay rows 506 in columns 512 in view 510. In various embodiments, changes made to the right hand columns 512 and 522 and the left hand columns 514 and 524 may include an automatic determination as to whether columns in addition to the column selected from the overview menu may be displayed in the next given view, and displaying the more than one column of data on either the right hand column or the left hand column of a given view, as illustrated but not limited to the description provided with respect to FIGS. 4A and 4B.

Figure 5B:
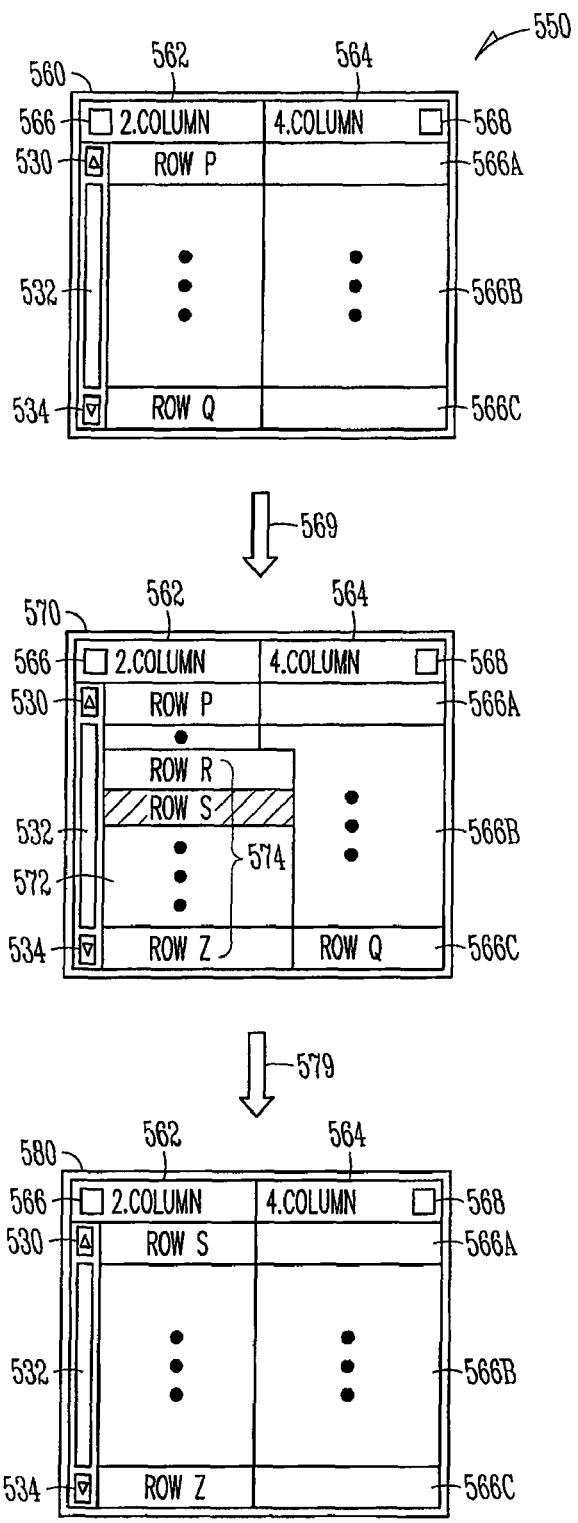

FIG. 5B is a diagrammatic representation of illustrative views 550 provided in various embodiments. Views 550 includes view 560, view 570, and view 580.

By way of illustration, each of views 560, 570, and 580 include a left hand column 562, a right hand column 564, and symbols 566 and 568. Symbols 566 and 568 are operable to allow requests for overlay menus related to column 562 and 564 respectively. Also by way of illustration, each of views 560, 570, and 580 include symbol 530, symbol 534, and scroll bar 532. Scroll bar 532 is operable to allow a user to scroll or page up and down within a view among the available rows in a two-dimensional data source, such as a table. As shown in view 560, row P is viewable at row position 566A, the upper most row position, in view 560, and row Q is viewable at row position 566C, the lower most row position in view 560. Addition rows may be viewed between row P and row Q at row positions 566B in view 560.

Symbols 530 and 534 are not limited any particular type of symbol. In various embodiments, symbol 530 may be an upward pointing arrow head, and symbol 534 may be a downward pointing arrow head. In various embodiments, actuation of one of the symbols 530 or 534 is used to request an overlay menu. The overlay menu in some embodiments provides a selectable list of rows that may be chosen to replace the rows currently displayed in a given view.

By way of illustration, an actuation of symbol 534 may provide a move from view 560 to view 570 as represented by arrow 569. View 570 includes overlay menu 572 including a listing 574 of rows that are available for display. The rows included in overlay menu 572 are not limited to any particular rows. In some embodiments, the listing 574 may begin with the next row available in a two-dimensional data source that is immediately below the row currently displayed at row position 566C. In view 570, the first row in listing 574 is row R, which is the next row available for display immediately below row Q.

In view 570, row S is highlighted, indicating a selection has been made on row S. The selection of row S moves the display from view 570 to view 580 as represented by arrow 579. In view 580, the displayed row at row position 566A is now row S, and the displayed row at position 566C is row Z. The number of rows included in view 580 may be determined based on the height of the rows included with the row selected from the overlay menu and any rows adjacent (in this instance below) to the selected row.

As would be understood by those of ordinary skill in the art, symbol 530 may be used to enable requests for an overlay menu including a listing of rows. In some embodiments, symbol 530 may be used to request an overlay menu including a listing of rows available for display and that are above row P in a two-dimensional data source such as a table.

Figure 6:
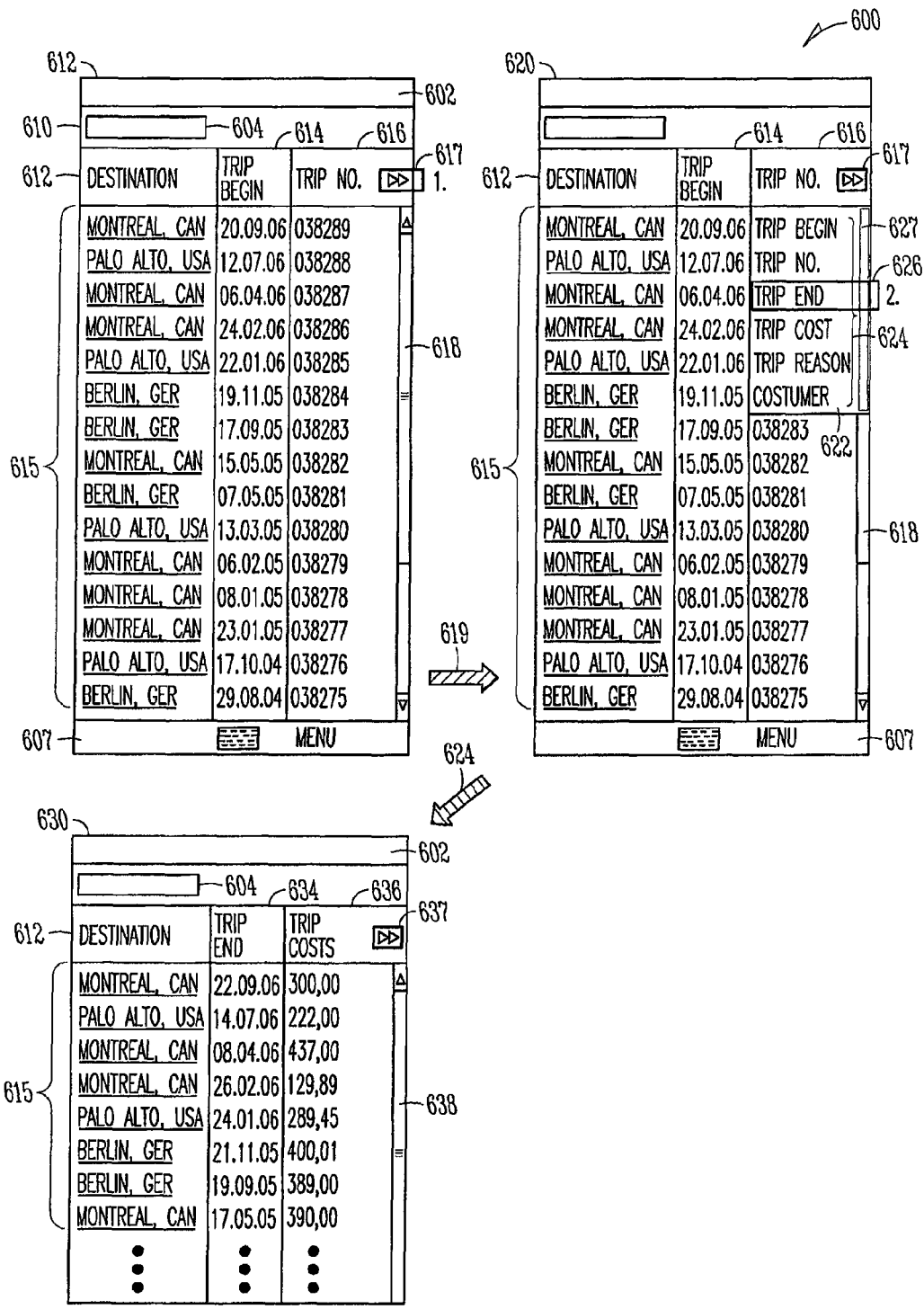
FIG. 6 is a diagrammatic representation of a sequence of illustrative views provided in various embodiments.

FIG. 6 is a diagrammatic representation of a sequence of illustrative views 600 provided in various embodiments Views 600 include view 610, view 620, and view 630. Views 610, 620, and 630 show illustrative data being displayed wherein navigation between different columns is used to display different secondary attributes in relation to a column of data including a primary attribute. The column of data including the primary attribute includes names of cities in various countries. The secondary attributes in the illustrative data relate to travel to (or from) each of the particular cities included in the primary attribute data.

In various embodiments, each of views 610, 620, and 630 includes a tool bar 602, an information block 604, and a auxiliary selection bar 607. The tool bar 602 and the auxiliary selection bar 607 are not limited to any particular type of display format or information, and may include any information, icons, and other selectable options particular to the device or the software used to provided views 610, 620, and 630. In various embodiments, information block 604 may include a description or a name of the table or the two-dimensional data source from which the displayed data is being provided.

View 610 includes a column 612 including a header including the phrase "Destination." This header provides a description of the primary attribute data included in column 612 (in this illustration—the cities), the cities being listed in one of each of a plurality of rows 615. View 610 also includes column 614 including a header including the phrase "Trip Begin," and column 616 including a header including the phrase "Trip No." The illustrative data included in each of the plurality of rows 615 under column 614 corresponds to a time of a trip to begin associated with the city in the same row. The illustrative data included in each of the plurality of rows 615 under column 616 corresponds to a trip number associated to a trip to (or from) the city in the same row. Column 616 also includes symbol 617 in the header of column 616. Symbol 617 is operable to receive requests to provide an overlay menu listing of the columns of data that may be displayed directly beside the data included in column 612.

In various embodiments, view 610 includes a scroll bar 618 operable to allow a user to scroll up or down in order to view additional rows of data included in the plurality of rows 615 of data that are not currently being displayed within view 610.

In various embodiments, a request is made using symbol 617 for an overlay menu, resulting in view 620 being displayed as illustrated by arrow 619. Overview menu 622 includes listing 624. View 620 includes columns 612, 614, and 616 and overlay menu 622 being displayed. In various embodiments, overlay menu 622 is displayed as a layer over one or more rows 615 in column 616. In various embodiments, overlay menu 622 may be displayed as a layer over one or more rows 615 in both columns 614 and 616. In various embodiments, overview menu 622 may be displayed over scroll bar 618. In various embodiments, scrolling using scroll bar 618 is disabled while overview menu 622 is being displayed. In various embodiments, overview menu includes a scroll bar 627. Scroll bar 627 may be provided in instances where the number of entries in overview menu 622 exceeds the space available to display the entire overview menu, wherein the scroll bar 627 may be used to scroll up or down through the listing 624 of the overview menu 622 in order to view entries in the listing 624 that are not currently being displayed.

In various embodiments, overview menu 622 includes a listing of available columns by including the description of the available columns using the phrase that will appear in the header of a column when the particular column is displayed in a view.

As illustrated in view 620, a selection is made on the column of data related to "Trip End." As a result of this selection, the view moves to view 630, including column 612 displaying "Destination" data, column 634 displaying "Trip End" data, and column 636 displaying "Trip Costs" data. By making a single selection on "Trip End" in view 620, and automatic determination was made that the column including the requested "Trip End" data and the next adjacent column including the "Trip Costs" data could be included in the right hand side of view 630. The rows are also automatically aligned in view 630 so that the proper data related to "Trip End" and "Trip Costs" for each of the cites listed in column 612 aligns with the proper data in columns 634 and 636. In view 630, column 636 includes symbol 637 operable to allow requests for the overview menu to again be displayed.

Figure 7:
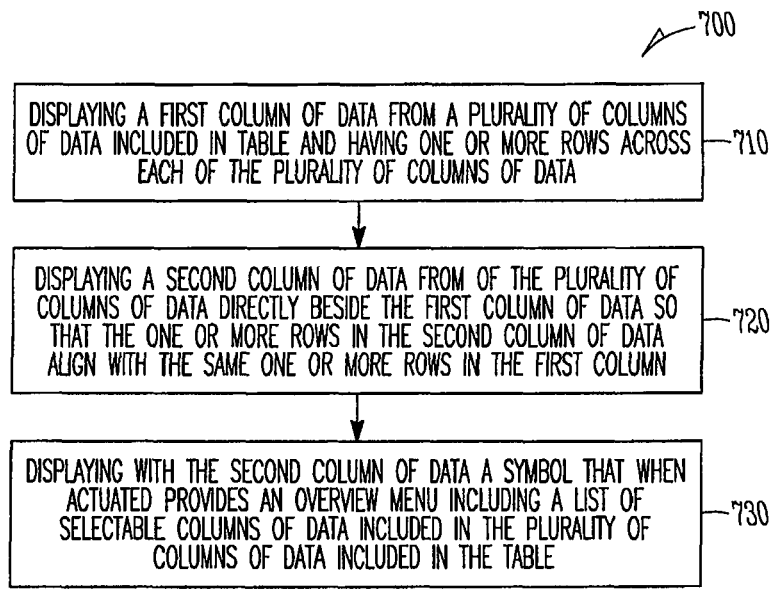
FIG. 7 is a flowchart illustrating a method according to various embodiments.

FIG. 7 is a flowchart illustrating a method 700 according to various embodiments.

At block 710, method 700 includes displaying a first column of data from a plurality of columns of data included in table and having one or more rows across each of the plurality of columns of data. In various embodiments of method 700, displaying a first column of data includes determining which of the plurality of columns of data included in the table is to be displayed as the first column of data based on a default value stored in the table. 1B. In various embodiments, displaying the first column of data includes displaying a plurality of left hand columns of data and displaying the second column of data directly beside a right most column of data within the plurality of left hand columns of data.

At block 720, method 700 includes displaying a second column of data from of the plurality of columns of data directly beside the first column of data so that the one or more rows in the second column of data align with the same one or more rows in the first column. In various embodiments of method 700, displaying the second column of data further includes automatically determining whether the second column of data and one or more additional columns from the plurality of columns of data may be displayed based on a width of the display, a width of the second column of data, and desirably a width one or more other columns of data associated with the table. In various embodiments, displaying a second column of data includes displaying a plurality of right hand columns of data, and wherein displaying with the second column of data the symbol includes displaying the symbol within a header of a right most column within the plurality of right hand columns of data.

At block 730, method 700 includes displaying in association with the second column of data a symbol that when actuated provides an overview menu including a list of selectable columns of data included in the plurality of columns of data included in the table. Various embodiments of method 700 include wherein if a selectable column of data is selected from the overview menu associated with the second column of data the selected column of data would be displayed directly beside the first column of data in place of the second column of data regardless of the relative position of the selected column of data within the table.

Various embodiments of method 700 further include actuating the symbol, and displaying a list of the selectable columns of data displayed as an overview menu overlaying some portion of the second column of data. Various embodiments of method 700 further include selecting from the overview menu a single one of the selectable columns of data, and displaying data from the single one of the selectable column of data directly beside the first column of data in place of the second column of data.

Various embodiments of method 700 further include displaying with the first column of data a different symbol that when actuated provides an overview menu including a list of selectable columns of data included in the plurality of columns of data included in the table and wherein if a selectable column of data is selected from the overview menu the selected column of data would be displayed in place of the first column of data. In various embodiments, the overview menu for a particular column is limited to displaying a listing of columns meeting certain criteria, for instance but not limited to a listing including only column that have been designated as having primary data or have been designated as including leading attributes. Various embodiments include when a selectable column of data is selected from the overview menu the selected column of data and at least one additional column of data would be displayed in place of the first column of data.

Figure 8:
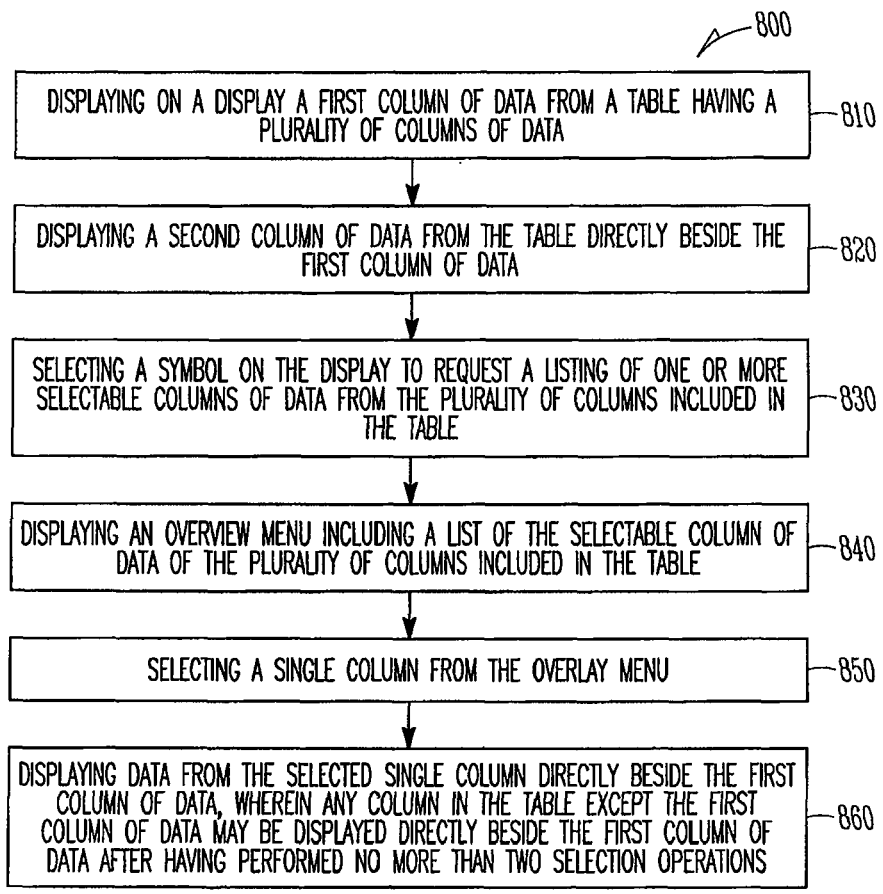
FIG. 8 is a flowchart illustrating a method according to various embodiments.

FIG. 8 is a flowchart illustrating a method 800 according to various embodiments.

At block 810, method 800 includes displaying on a display a first column of data from a table having a plurality of columns of data. In various embodiments, displaying on a display includes the display having a width that is less than a width required to display all of the plurality of columns in the table at a same time. In various embodiments, displaying the first column of data includes displaying data related to a leading attribute.

At block 820, method 800 includes displaying a second column of data from the table directly beside the first column of data.

At block 830, method 800 includes selecting a symbol on the display to request a listing of one or more selectable columns of data from the plurality of columns included in the table. In various embodiments, selecting the symbol on the display includes displaying the symbol as part of a header over a column of data farthest from the first column of data in the display.

At block 840, method 800 includes displaying an overview menu including a list of the selectable column of data of the plurality of columns included in the table. In various embodiments, displaying the overview menu includes displaying a listing of all of the plurality of columns of data included in the table except for the first column of data from the table. In various embodiments, displaying the overlay menu includes displaying a scroll bar as part of overlay menu, the scroll bar operable to allow scrolling up or down through a listing of the plurality of column of data in the table as provided in the overview menu. In various embodiments, displaying an overlay menu includes displaying a list of columns of data from the table that include only data related to secondary attributes.

At block 850, method 800 includes selecting a single column from the overlay menu.

At block 860, method 800 includes displaying data from the selected single column directly beside the first column of data, wherein any column in the table except the first column of data may be displayed directly beside the first column of data after having performed no more than two selection operations. In various embodiments, displaying data from the selected single column further includes automatically determining whether the selected single column and one or more additional columns from the plurality of columns of data may be displayed based on a width of the display, a width of the selected single column, and a width of one or more columns adjacent to the selected column.

Figure 9:
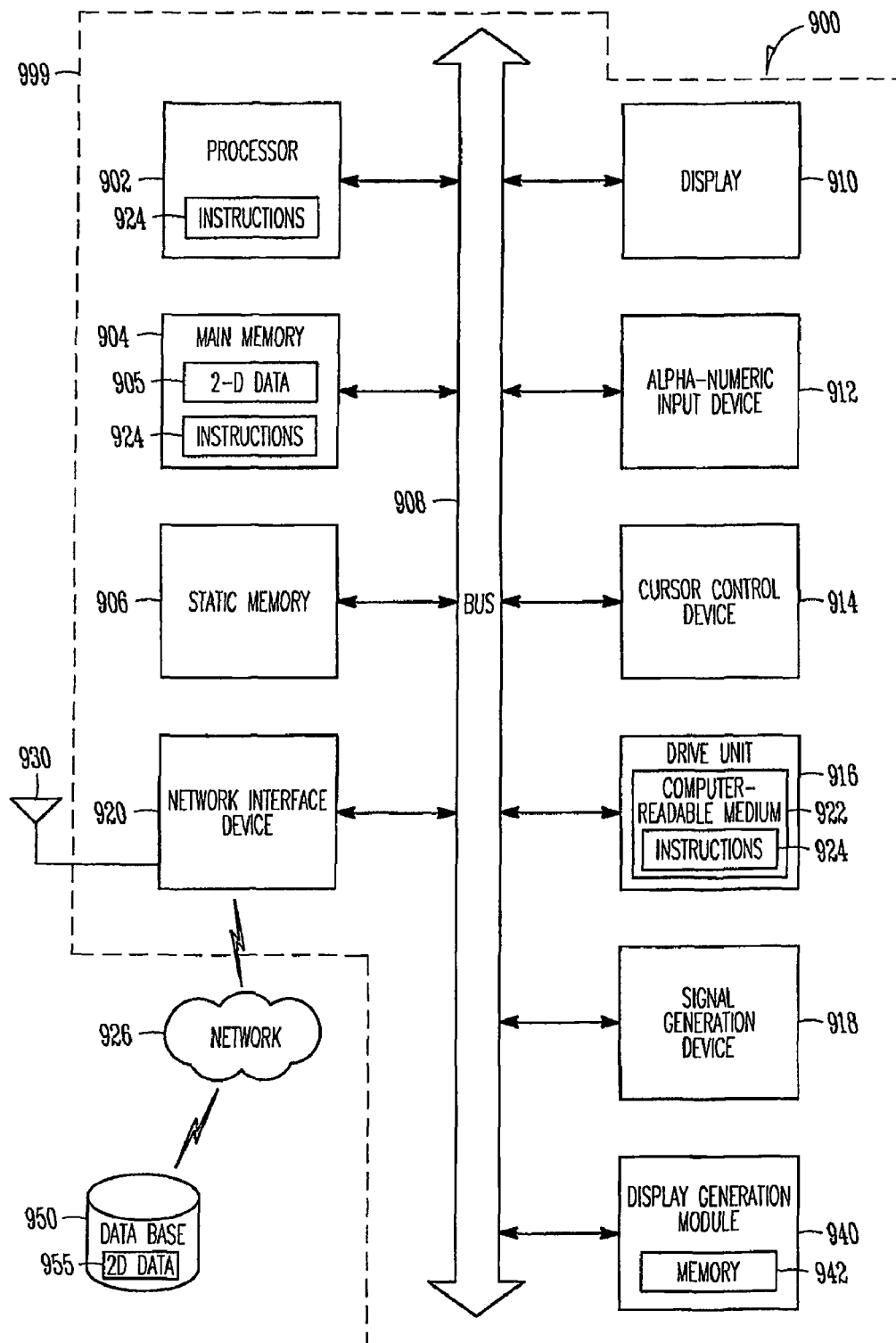
FIG. 9 is a block diagram of a machine in the illustrative form of a computer system within which a set of instructions, for causing the machine to perform any one or more of the methodologies discussed herein, may be executed.

FIG. 9 is a block diagram of machine in the example form of a computer system 900 within which a set of instructions, for causing the machine 999 to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine 999 may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which may communicate with each other via a bus 908. The computer system 900 may further include a video display 910 (e.g., a liquid crystal display (LCD) or a cathode ray tube (CRT)). Display 910 is not limited to any particular type of display, and is not limited to a display using any particular type of technology. In various embodiments, display 910 is the display used to provide the various view as described herein. In various embodiments, display 910 has a width, such as width 124 as shown in FIG. 1, that limits the number of columns that display 910 is able to display at any given time.

In various embodiments, machine 999 includes a display generation module 940. In various embodiments, display generation module 940 is a software application. In various embodiments, display generation module 940 includes hardware which may include a memory storage device 942, which may include software stored on the memory storage device. In various embodiments, display generation module 940 is operable to generate commands to format data to be displayed on display 910 according to the various methods described herein.

In various embodiments, display generation module 940 automatically generates and formats the data to be displayed on display 910 based on the know characteristic of display 910, such as the width of display 910, and based on the default column and the requested columns of data to be display on display 910. In various embodiments, display generation module 940 receives the data from a table or a two-dimensional data source to be displayed from a source external to the display generation module 940, such as main memory 904, or database 950, and automatically formats the data as a view to be displayed on display 910. In various embodiments, display generation module 940 automatically determines if a plurality of new columns of data may be inserted into a column of a view based on selection made from an overview menu. In various embodiments, display generation module 940 receives from display 910 an indication that a request for an overview menu has been made, and formats the overview menu to be displayed on display 910. In various embodiments, display generation module 940 receives from a device such as cursor control device 914 commands or signals indicative of a request to scroll or a selection from one of a displayed overview menu has been made at the display 910. In various embodiments, display generation module 940 receives signals that indicate a request to scroll or page up or down with respect to the rows being displayed in a view, and formats the data for display based on the request to scroll or page to one or more different rows for display in a view.

In various embodiments, display generation module 940 may store a default column indicator to be used to determine which column in a particular table or other two-dimensional data source is to be used as the default column and is to be displayed on the left hand column in a view. In various embodiments, the display generation module 940 stores the listing for the overview menu to be provided in response to a request for the overview menu when displaying columns from a particular table or other two-dimensional data source. In various embodiments, the display generation module 940 stores the phrases or other information provided as part of a listing in an overview menu.

The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Various embodiments of computer system 900 include disk drive unit 916 includes a machine-readable medium 922 on which is stored one or more sets of instructions and data structures (e.g., software 924) embodying or utilized by any one or more of the methodologies or functions described herein. In various embodiments, machine-readable medium 922 may includes one or more tables including columns of data, or one or more other two-dimensions data sources to be displayed on display 910. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (e.g., HTTP). In various embodiments, machine 999 is a wireless device and includes antenna 930 communicatively coupling machine 999 to network 926 or other devices (not shown). Other devices may include other machines similar to machine 999, wherein machine 999 and the other machines operate in an ad-hoc mode of communicator with one and other.

In various embodiments, network 926 couples machine 999 to a database 950. In various embodiments, database 950 includes data, such as two-dimensional data 955, that may be displayed on machine 999 using display 910.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Figure 10:
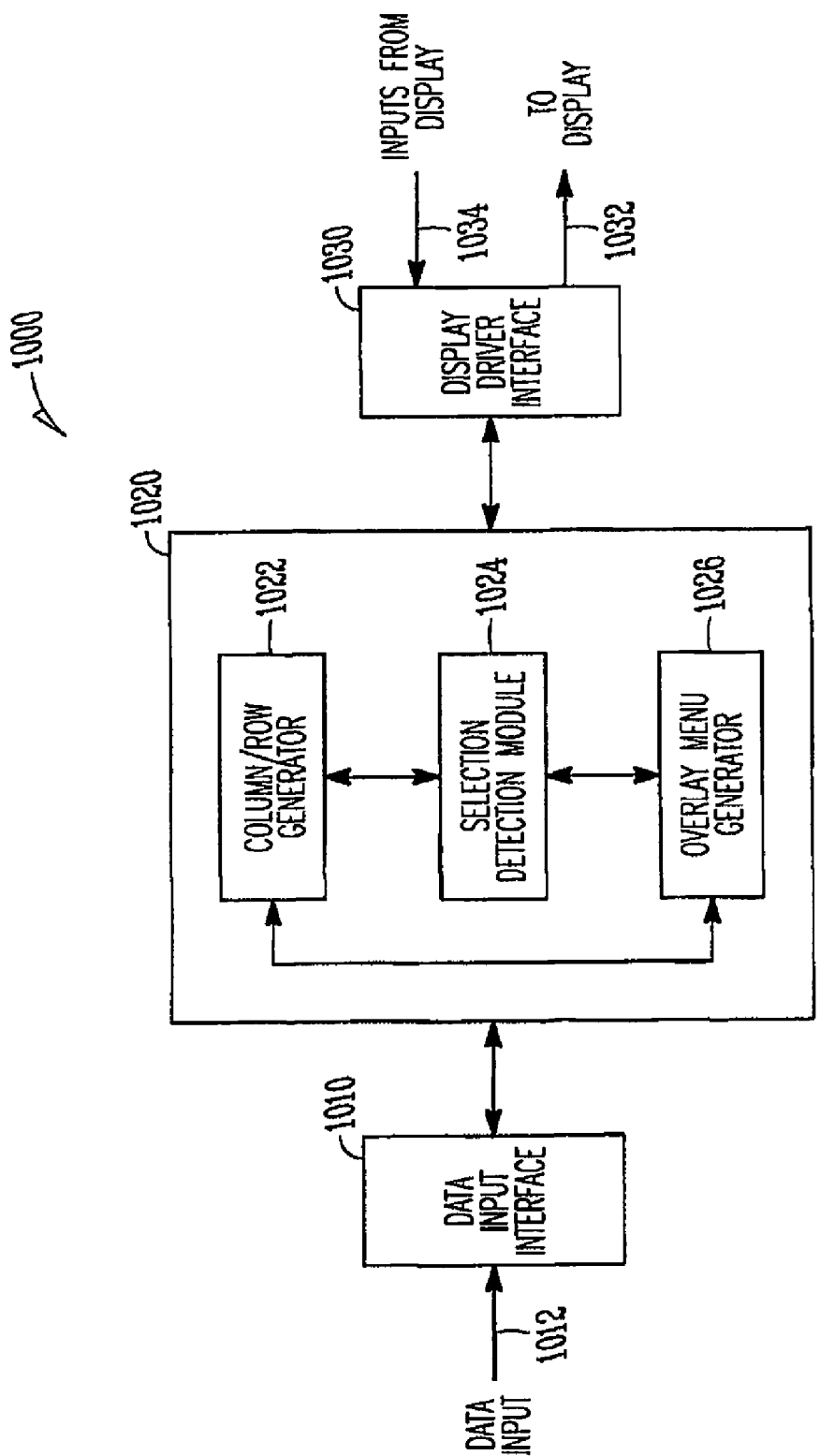
FIG. 10 is a diagram of a software architecture according to various embodiments.

FIG. 10 is a diagram of a architecture 1000 according to various embodiments. In various embodiments, architecture 1000 includes module 1020. Module 1020 may be software, hardware, or may be a combination of software and hardware. In various embodiments, module 1020 may include software stored as instructions, for example the instructions 924 associated with processor 902 in FIG. 9. In various embodiments, module 1020 may be the display generation module 940 as shown in FIG. 9. In various embodiments, module 1020 includes instructions that may be stored in more than one place within architecture 1000.

In various embodiments, module 1020 includes one or more of the following: column/row generator 1022, selection detection module 1024, and overlay menu generator 1026. In various embodiments, module 1020 is coupled to data input interface 1010. In various embodiments, data input interface 1010 is operable to receive input data 1012 and to provide module 1020 with the data, such as data included in one or more two-dimensional data sources, such as but not limited to a table.

In various embodiments, module 1020 is coupled to a display driver interface 1030. In various embodiments, display driver interface 1030 interfaces with module 1020 to receive data provided by module 1020 and provides an output 1032 to control a display (not shown).

In operation, column/row generator 1022 is used in various embodiments to generate commands for controlling a view of a display. In various embodiments, the view is based on the data provided to module 1020 and based on the selections made for controlling the view being provided on the display. In various embodiments, selection detection module 1024 is operable to receive a signal indicating that a selection related to the display has been made. In various embodiments, the selection includes a request made for an overlay menu. The request may be for an overlay menu related to columns, or for an overlay menu related to rows. Based on a detected selection, the overlay menu generator 1026 is operable to generate the overlay menu, and provide the generated overlay menu to the column/row generator 1022. Column/row generator 1022 is operable to provide to the display driver interface 1030 the proper commands to have the requested overlay menu appear on the display. The commands may then be forwarded through output 1032 to the a display. In various embodiments, the column/row generator determines the proper alignment between row of displayed data when a new column for display has been selected.

In various embodiments, selection detection module 1024 is operable to receive a signal indicating that a selection from an overlay menu has been made. The selection detection module 1024 may then provide the information regarding the selection from the overlay menu to the column/row generator 1022, which in turn generates commands to cause the display to be updated based on the selection made from the overlay menu.

In various embodiments, the signals indicating a request for an overlay menu are provided as a data input 1012. In various embodiments, the signals indicating a request for an overlay menu may be provided as an input 1034 from the display through display driver interface 1030. In various embodiments, the signals indicating a selection has been made from an overlay menu are provided as a data input 1012. In various embodiments, the signals indicating that a selection has been made from an overlay menu are provided as an input 1034 from the display through display driver interface 1030.

Various embodiments of apparatus, methods, and system have been described herein. Various embodiments include an apparatus comprising a display to provide a visual representation of one or more portions of a table having a plurality of columns, and a display generation module coupled to the display, the display generation module to generate commands to cause the display to provide a view of a first column of data and at least one other column of data directly beside the first column in the view, wherein the first column of data and the at least one other column of data are both from a same two-dimensional data source having a plurality of columns and wherein the at least one other column is selectably any column from the plurality of columns in the table.

Various embodiments include a system comprising a wireless device including an antenna to communicatively couple the wireless devices to one or more other devices, and the wireless device including a display and a display generation module couple to the display, the display generation module to generate commands to cause the display to provide a view of a first column of data and at least one other column of data directly beside the first column in the view, wherein the first column of data and the at least one other column of data are both from a same two-dimensional data source having a plurality of columns and wherein the at least one other column is any column from the plurality of columns.

Various embodiments include a machine-readable medium embodying instructions that, when executed by a machine, cause the machine to display a first column of data from a plurality of columns of data included in table and having one or more rows across each of the plurality of columns of data, to display a second column of data from of the plurality of columns of data directly beside the first column of data so that the one or more rows in the second column of data align with the same one or more rows in the first column, and to display within the second column of data a symbol that when actuated provides an overview menu including a list of selectable columns of data included in the plurality of columns of data included in the table and wherein if a selectable column of data is selected from the overview menu the selected column of data would be displayed directly beside the first column of data in place of the second column of data regardless of the relative position of the selected column of data within the table.

The embodiments can be implemented in digital electronic circuitry, or in computer hardware, firmware, software, or in combinations of them. The embodiments can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the embodiments can be performed by one or more programmable processors executing a computer program to perform functions of the embodiments by operating on input data and generating output. Method operations can also be performed by, and apparatus of the embodiments can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The embodiments can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the embodiments, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

Although an embodiment have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Embodiments from one or more drawings may be combined with embodiments as illustrated in one or more different drawings. This Detailed Description, therefore, is not to be taken in a limiting sense, and the scope of various embodiments is defined only by the appended claims, along with the full range of equivalents to which such claims are entitled.

While the foregoing disclosure shows a number of illustrative embodiments, it will be apparent to those skilled in the art that various changes and modifications can be made herein without departing from the scope of the embodiments as defined by the appended claims. Accordingly, the disclosed embodiment are representative of the subject matter which is broadly contemplated by the embodiments, and the scope of the embodiments fully encompasses other embodiments which may become obvious to those skilled in the art, and that the scope of the embodiments is accordingly to be limited by nothing other than the appended claims.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process operations described herein may be implemented as electronic hardware, computer software, or combinations of both.

To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The previous description of the disclosed embodiments is provided to enable any person skilled in the art to make or use the embodiments. Various modifications to these embodiments will be readily apparent to those skilled in the art, and the generic principles defined herein may be applied to other embodiments without departing from the spirit or scope of the embodiments. Thus, the embodiments are not intended to be limited to the embodiments shown herein but are to be accorded the widest scope consistent with the principles and novel features disclosed herein, The abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   displaying a first column of data from a plurality of columns of data included in a table and having one or more rows across each of the plurality of columns of data;
   displaying a second column of data from the plurality of columns of data directly beside the first column of data so that the one or more rows in the second column of data align with the same one or more rows in the first column; and
   displaying with the second column of data a symbol that when actuated provides an overview menu including a list of selectable columns of data included in the plurality of columns of data included in the table and wherein when a selectable column of data is selected from the overview menu the selected column of data would be displayed directly beside the first column of data in place of the second column of data regardless of a relative position of the selected column of data within the table,
   wherein when the selected column of data is selected from the overview menu, automatically determining whether the selected column of data and one or more additional columns from the plurality of columns of data can be displayed based on a width of a given display, a width of the selected column of data, and a width of each of the one or more additional columns adjacent in the table to the selected column of data, and
   displaying at least the selected column of data in place of the second column of data and also displaying at least one of the one more additional columns if the at least one or more additional columns can be displayed in addition to the selected column of data in place of the second column of data.

2. The method of claim 1, wherein displaying a second column of data includes displaying a plurality of right hand columns of data, and wherein displaying with the second column of data the symbol includes displaying the symbol within a header of a right most column within the plurality of right hand columns of data.

3. The method of claim 1, wherein displaying the first column of data includes displaying a plurality of left hand columns of data and displaying the second column of data directly beside a right most column of data within the plurality of left hand columns of data.

4. The method of claim 1, further including:
   detecting an actuation made using the symbol; and
   displaying a list of the selectable columns of data displayed as an overview menu overlaying some portion of the second column of data.

5. The method of claim 4, further including:
   detecting a selection made from the overview menu including a selection of a single one of the selectable columns of data; and
   displaying data from the single one of the selectable columns of data directly beside the first column of data in place of the second column of data.

6. The method of claim 1, wherein displaying a first column of data includes:
   determining which of the plurality of columns of data included in the table is to be displayed as the first column of data based on a default value stored in the table.

7. The method of claim 1, further including:
   displaying with the first column of data a different symbol that when actuated provides an overview menu including a list of selectable columns of data included in the plurality of columns of data included in the table and wherein when a selectable column of data is selected from the overview menu the selected column of data would be displayed in place of the first column of data.

8. The method of claim 7, wherein when a selectable column of data is selected from the overview menu the selected column of data and at least one additional column of data would be displayed in place of the first column of data.

9. A method comprising:
displaying on a display a first column of data from a table having a plurality of columns of data;
displaying a second column of data from the table directly beside the first column of data;
detecting a selection of a symbol on the display to request a listing of one or more selectable columns of data from the plurality of columns included in the table;
displaying an overview menu including a list of the one or more selectable columns of data of the plurality of columns included in the table;
detecting a selection of a single column from the overview menu; and
displaying data from the selected single column directly beside the first column of data, wherein any column in the table except the first column of data may be displayed directly beside the first column of data after having performed no more than two selection operations,
wherein displaying data from the selected single column further includes automatically determining whether the selected single column and one or more additional columns from the plurality of columns of data may be displayed based on a width of the display, a width of the selectable column of data, and a width of one or more additional columns adjacent in the table to the selected single column of data, and
displaying at least the selected single column of data in place of the second column of data and also displaying at least one of the one more additional columns if the at least one of the one or more additional columns can be displayed in addition to the selected single column of data in place of the second column of data.

10. The method of claim 9, wherein displaying on a display includes the display having a width that is less than a width required to display all of the plurality of columns in the table at a same time.

11. The method of claim 9, wherein displaying the overview menu includes displaying a listing of all of the plurality of columns of data included in the table except for the first column of data from the table.

12. The method of claim 9, wherein displaying the overview menu includes:
displaying a scroll bar as part of the overview menu, the scroll bar operable to allow scrolling up or down through a listing of the plurality of column of data in the table as provided in the overview menu.

13. The method of claim 9, wherein selecting the symbol on the display includes:
displaying the symbol as part of a header over a column of data farthest from the first column of data in the display.

14. The method of claim 9, wherein displaying the first column of data includes:
displaying data related to a leading attribute.

15. The method of claim 9, wherein displaying the overview menu includes:
displaying a list of columns of data from the table that include only data related to secondary attributes.

16. An apparatus comprising:
a display to provide a visual representation of one or more portions of a table having a plurality of columns;
a display generation module coupled to the display, the display generation module to generate commands to cause the display to provide a view of a first column of data and at least one other column of data directly beside the first column of data in the view, wherein the first column of data and the at least one other column of data are both from a same two-dimensional data source having a plurality of columns and wherein the at least one other column of data is selectable from any column of the plurality of columns in the table,
wherein the view of the at least one other column includes at least one column of data including a symbol, wherein the symbol is operable to be actuated so as to provide an overview menu including a list of selectable columns of data included in the plurality of columns of data included in the table, and
wherein the display generation module is operable to, upon actuation of the symbol, automatically determine if more than one of the plurality of columns of data may be displayed in a view based on the selection of a single one of the plurality of columns, a width of the single one of the plurality of columns, and a width of one or more columns of the plurality of columns adjacent in the table to the single one of the plurality of columns,
and to generate commands to cause the display to display at least the single one of the plurality of columns of data in place of the at least one other column of data, and to also display at least one or more columns of the plurality of columns of data adjacent in the table to the single one of the plurality of columns if the at least one or more columns adjacent to the single one of the plurality of columns can be displayed in addition to the single one of the plurality of columns in place of the at least one other column of data.

17. The apparatus of claim 16, the display generation module further including:
a memory device to store an indication of a default column from the same two-dimensional data source to be displayed as the first column of data in the view.

18. The apparatus of claim 16, wherein the display generation module includes an input to receive a request to provide the overview menu as an overlay in the view.

19. The apparatus of claim 16, wherein the display generation module includes a memory device storing a value for a width of the display, and a value of each of the plurality of columns included in the same two-dimensional data source.

20. The apparatus of claim 16, where the display generation module is operable to automatically determine if more than one of the plurality of columns of data may be displayed in a view based on the selection of a single one of the plurality of columns.

21. The apparatus of claim 16, wherein the display generation module is operable to generate the symbol having an indication that one or more data columns that are not displayed in a current view are included in the table.

22. A system comprising:
a wireless device including an antenna to communicatively couple the wireless devices to one or more other devices;
the wireless device including a display and a display generation module coupled to the display, the display generation module to generate commands to cause the display to provide a view of a first column of data and at least one other column of data directly beside the first column in the view, wherein the first column of data and the at least one other column of data are both from a same two-dimensional data source having a plurality of columns and wherein the at least one other column is any column from the plurality of columns, wherein the view of the at least one other column of data includes at least one column of data including a symbol, wherein the symbol is operated to be actuated so as to provide an overview menu including a list of selectable columns of data included in the plurality of columns of data included in the same two-dimensional data source, wherein when the selected column of data is selected from the overview menu, automatically determining whether the selected column of data and one or more additional columns from the plurality of columns of data can be displayed based on a width of a given display, a width of the selected column of data, and a width of each of the one or more additional columns adjacent in the table to the selected column of data, and displaying at least the selected column of data in place of the second column of data and also displaying at least one of the one more additional columns if the at least one or more additional columns can be displayed in addition to the selected column of data in place of the second column of data.

23. The system of claim 22, wherein the wireless device is a cellular telephone.

24. The system of claim 22, wherein the wireless device is a personal digital assistant.

25. The system of claim 22, wherein the wireless device is operable to receive from a remote database data from a two-dimensional data source, and to display at least two columns of data from the two-dimensional data source on the display.

26. The system of claim 22, wherein the display is a touch screen operable to allow a user to actuate a request signal to display the overview menu provided to the display generation module by touching the symbol provided on the display.

27. A computer system including a non-transitory computer memory storing instructions that, when executed by a processor, cause the computer system to:

display a first column of data from a plurality of columns of data included in table and having one or more rows across each of the plurality of columns of data;

display a second column of data from the plurality of columns of data directly beside the first column of data so that the one or more rows in the second column of data align with the same one or more rows in the first column;

display within the second column of data a symbol that when actuated provides an overview menu including a list of selectable columns of data included in the plurality of columns of data included in the table and wherein if a selectable column of data is selected from the overview menu the selected column of data would be displayed directly beside the first column of data in place of the second column of data regardless of the relative position of the selected column of data within the table, wherein when the selectable column of data is selected from the overview menu, automatically determining whether the selectable column of data and one or more additional columns from the plurality of columns of data can be displayed based on a width of a given display, a width of the selected column of data, and a width of each of the one or more additional columns adjacent in the table to the selected column of data, and displaying at least the selected column of data in place of the second column of data and also displaying at least one of the one more additional columns if the at least one or more additional columns can be displayed in addition to the selected column of data in place of the second column of data.

28. The apparatus of claim 16, wherein based on a selection of a column of data from the list of selectable columns of data in the overview menu, the data generation module is further operable to generate commands to cause the selected column of data to be displayed directly beside the first column of data in place of the second column of data regardless of a relative position of the selected column of data within the table.

* * * * *